May 5, 1936.  J. E. TRAINER  2,039,690
FIN TUBE MANUFACTURE
Filed Sept. 26, 1931   4 Sheets-Sheet 1
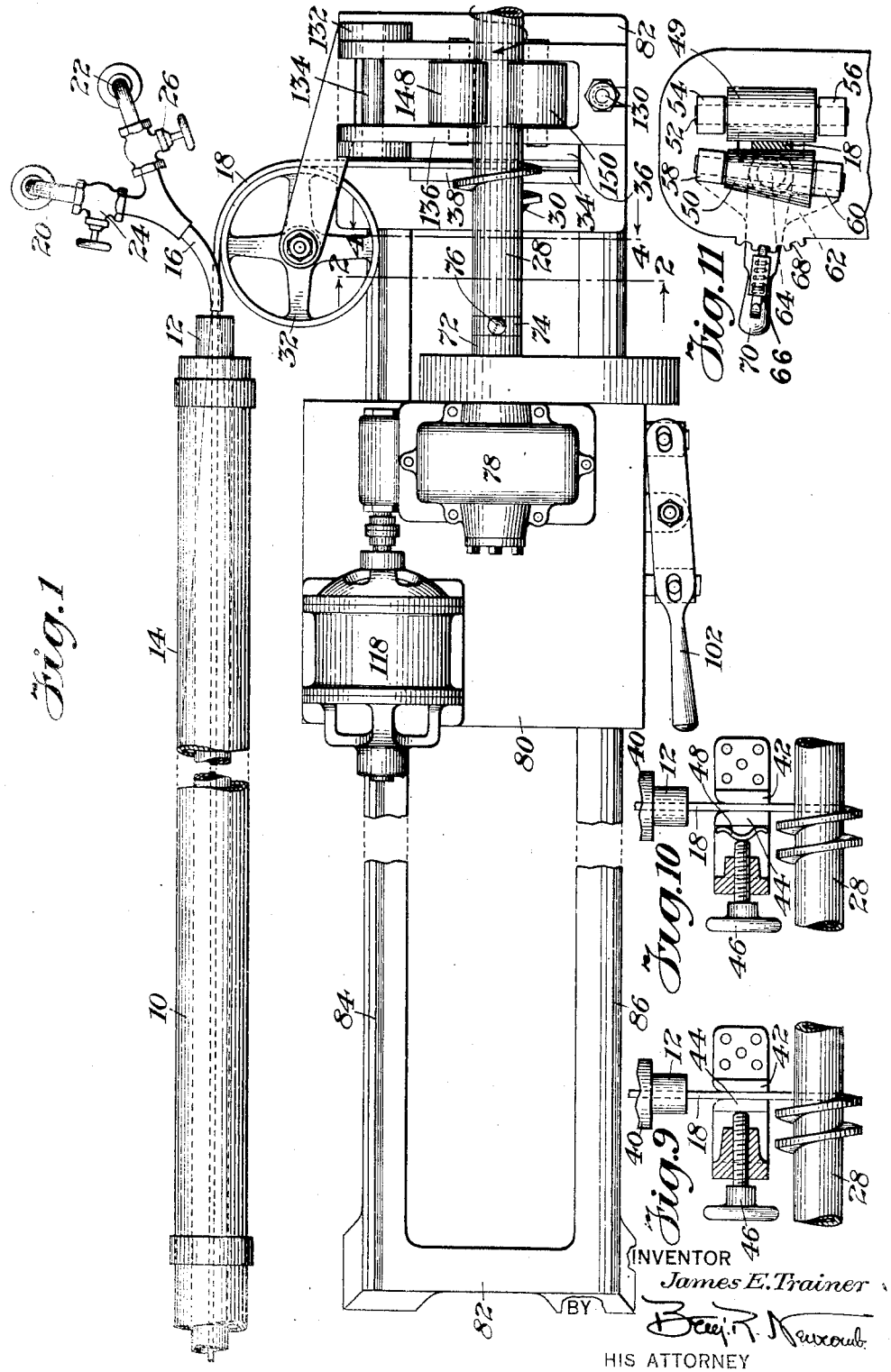
INVENTOR
James E. Trainer
BY
HIS ATTORNEY May 5, 1936.  J. E. TRAINER  2,039,690
FIN TUBE MANUFACTURE
Filed Sept. 26, 1931  4 Sheets-Sheet 2
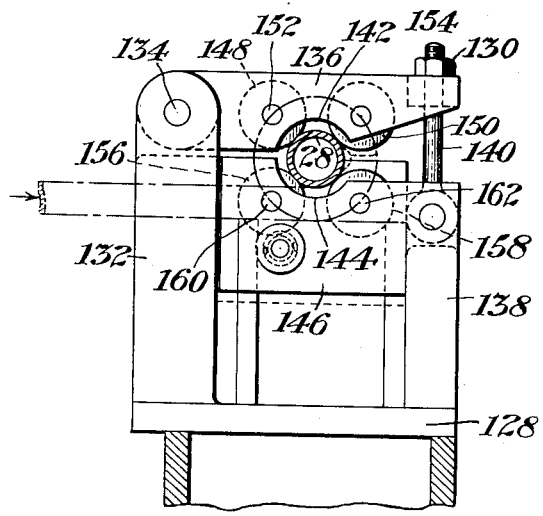
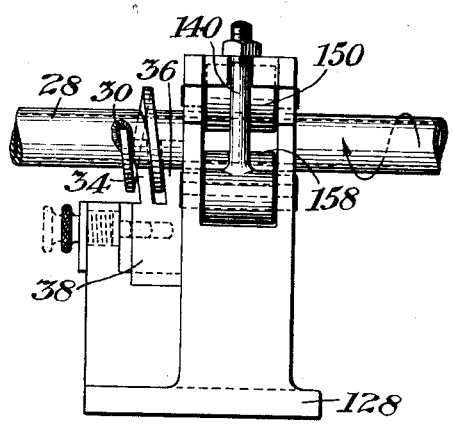
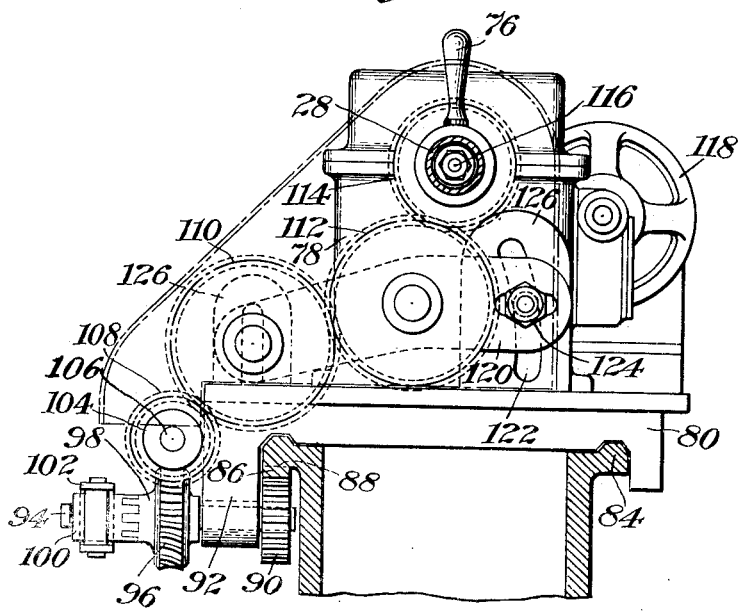
INVENTOR
James E. Trainer
BY
HIS ATTORNEY

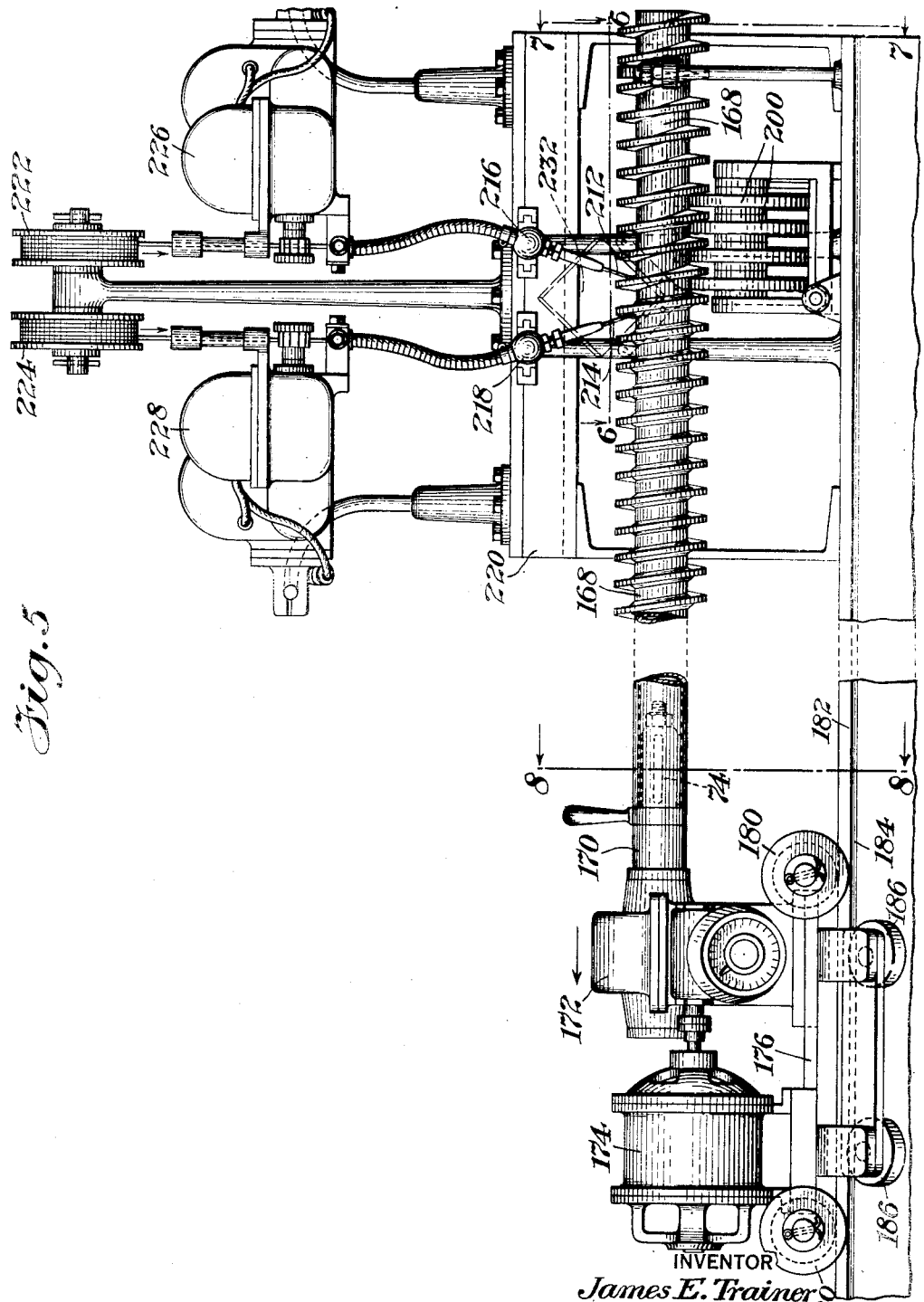

May 5, 1936.  J. E. TRAINER  2,039,690
FIN TUBE MANUFACTURE
Filed Sept. 26, 1931  4 Sheets-Sheet 4

INVENTOR
James E. Trainer
BY
HIS ATTORNEY

Patented May 5, 1936

2,039,690

UNITED STATES PATENT OFFICE 2,039,690

FIN TUBE MANUFACTURE

James E. Trainer, Barberton, Ohio, assignor to The Babcock & Wilcox Company, Bayonne, N. J., a corporation of New Jersey Application September 26, 1931, Serial No. 565,255

17 Claims. (Cl. 219—8)

This invention is concerned with the manufacture of helically finned metal elements.

An object of the invention is to attain such a mode of manufacture of such articles that a successful product is obtained with a minimum number of manufacturing operations.

It is also an object of the invention to provide improvements in a welding method and apparatus for permanently securing helically arranged fins to a plain metal tube. Further, it is intended to provide adequate heat transfer metal joining the base of the fin to the tube.

Other objects of the invention will appear as the accompanying description proceeds.

The invention will be described with reference to the accompanying drawings, in which:

Fig. 1 is a plan of the illustrative apparatus for forming a fin as a helix around a heat exchanger tube.

Fig. 2 is mainly an elevation taken on the line 2—2 of Fig. 1 illustrating the fixed guide for centering and holding the tube as it advances.

Fig. 3 is a front elevation of the guide shown in Fig. 2.

Fig. 4 is a vertical view taken on the line 4—4 of Fig. 1, illustrating the movable carriage in elevation.

Fig. 5 is a front elevation of the welding apparatus operating to permanently secure the helical fin to the tube by depositing weld metal at each side of the fin.

Fig. 9 is a detail view illustrating a device for applying pressure to the strip to cause it to be put under tension as the rotation of the tube pulls it along.

Fig. 10 is a detail view of a modification of the pressure device shown in Fig. 9.

Fig. 11 is a detail view of a pressure device which consists of rollers capable of giving the fin strip a tapering cross section.

Figure 6:
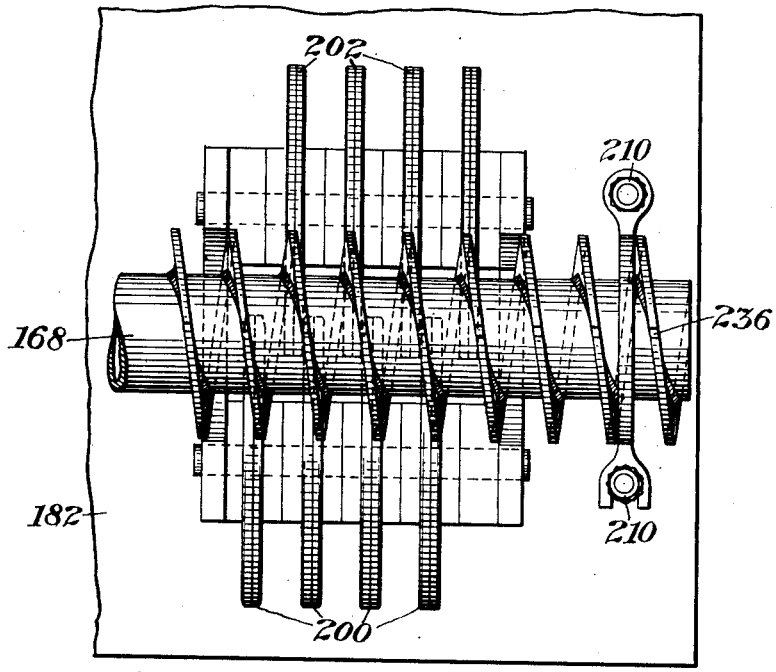
Fig. 6 is a view in the nature of a plan taken on the line 6—6 of Fig. 5 and showing the relationship of the rotatable supports which cause the tube to advance past electric arc welding devices.

The illustrative manufacture takes place in two stages, the first of which is carried out by the apparatus indicated in Fig. 1 of the drawings. In this stage, a straight flat steel strip is wound around a steel tube and simultaneously stretched so that the fin will have a tapering cross section when the shape of the strip is not such as to overcome this effect. The second stage of the manufacture is a welding operation which is carried out by the apparatus indicated in Fig. 5 of the drawings.

In carrying out the first stage of the illustrative manufacture, the fin forming strip is heated in a furnace 10 as it proceeds transversely therethrough. The furnace preferably consists of a chamber 12 surrounded by an outer casing 14 which preferably maintains a body of insulating material about the chamber. At one end of the furnace is located a burner 16 for projecting burning gases through the furnace and along the strip 18. The burner is supplied with gas and air from gas lines 20 and 22 the discharges from which are regulated by valves 24 and 26.

The cross-section of the strip to be wound on the tube determines the ultimate fin cross-section. When the strip 18 is of rectangular cross-section, a tapered fin is ultimately produced. If the strip is tapered and contacts with the tube at its apex the ultimate fin may not be tapered.

In the apparatus shown in Fig. 1, the end of the strip 18 is secured near the end of the tube 28 by a tack weld 30. When the tube is rotated and simultaneously advanced longitudinally the strip is pulled along. It is guided around the pulley 32 so that it approaches the tube in a position at right angles to the longitudinal axis of the tube. After passing by the pulley 32, the strip proceeds between the two forks 34 and 36 of a guide 38 which acts to give the fin its desired helical position. Properly positioning and shaping the guide also causes the fin to be gripped between the tube and the base of the groove between forks 34 and 36 so that the fin strip is wound with adequate tightness.

The interposition relative to the pulley 32 and the guide 38 of tension devices such as shown in any one of the Figs. 9, 10, and 11 puts tension on the strip to assist the stretching of the strip as it is wound around the tube. The presence of such devices also develops good tube contact with the fin.

It is to be understood that the tendency of the illustrative manufacture to produce a tapered fin results from the fact that the fin forming strip is stretched more at its outer circumference than it is at its inner circumference.

The tension device illustrated in Fig. 9 acts upon the strip 18 as it emerges from the furnace 40 which is preferably arranged with its longitudinal axis at right angles to the longitudinal axis of the tube 28. This device consists of a fixed friction member 42 against which the strip is pressed by the movable member 44. The pressure screw 46 is shown contacting directly with the member 44 to increase or decrease the retarding tension upon the moving strip.

In Fig. 10 the tension device includes a spring 48 which is interposed between members similar to the members 44 and 46 of the Fig. 9 construction.

In the tension device shown in Fig. 11 rollers 49 and 50 are presented. The roller 49 has its pintle 52 carried in fixed bearings 54 and 56. When the roller 49 is in the form of a cylinder and the roller 50 in the form of a frustrum of a cone, changes in the position of the latter roller cause a tapering action upon the strip 18. For producing these changes and varying the taper of the strip, the roller 50 is shown as having its bearings 58 and 60 carried by a support 62 oscillatable about a stud 64 and held in any desired position by a detent mechanism 66 engaging a fixed rack 68 and mounted upon a lever 70. When the rollers or cylinders are power driven the described manufacture is enhanced.

One end of the tube 28 is held in a chuck 72 illustrated as having jaws 74 capable of expanding action within the tube by reason of movement of the lever 76.

The chuck 74 is rotatably mounted in a transmission casing 78 supported upon a carriage 80. Simultaneous movement of the carriage and the tube lengthwise of the tube is permitted by reason of a portable mounting of the carriage upon a machine bed 82 shown as having rails 84 and 86 acting as tracks along which the carriage moves.

Fig. 4 discloses the track 86 as provided with a gear rack 88 having teeth meshing with the teeth of a gear 90 rotatably journalled in a support 92 dependent from the carriage 80. The gear 90 is preferably fixed upon a shaft 94 which rotatably carries a worm gear 96. The hub 98 of the worm gear is formed as part of a clutch having a driving member 100 nonrotatably mounted upon the shaft 94 and movable therealong into and out of clutch engagement by a clutch shifter 102. Other suitable gearing rendered operable by movement of the shifter 102 provides for the return of the carriage at high speed to its starting point.

The gear 96 is driven by a worm 104 fixed upon a shaft 106 which is rotated by a train of intermeshing spur gears 108, 110, 112, and 114. By this gearing, the chuck shaft 116 is intergeared with the gear 90 which causes the advancement of the carriage and the tube 28 when the motor 118 is in operation. This motor is shown as mounted upon the carriage 80 so as to be movable with the carriage and all of its operating mechanisms.

Fig. 4 also indicates devices for changing the gear ratios of the driving mechanism, these devices including a pivoted arm 120 adjustable along the member 122 and held in desired position thereon by the securing devices 124. The member 122 is preferably mounted on a fixture 126.

Appropriate changes in the mechanisms for intergearing the chuck shaft 116 and the gear 90 vary the pitch of the fin which is formed upon the tube 28 by the strip 18.

For maintaining the tube 28 properly centered with respect to the chuck 72 the tube guiding structure illustrated in Fig. 2 is provided. This structure has a base 128 which is preferably fixedly secured on the machine bed 82 by securing devices indicated at 130. Rising from the base is an upright 132 carrying at its upper end a trunnion 134. Pivotally mounted on the trunnion is a bifurcated guide arm 136 which is securable at its front ends to the front upright 138 by means of the locking bolt structure 140. The parts of the arm 136 are provided with notches 142 which are located opposite notches 144 in members 146 offset with relation to the base 128.

The arm 136 carries two rollers 148 and 150 rotatably mounted respectively on trunnions 152 and 154. These rollers contact with the upper side of the tube 28 as clearly indicated in Fig. 2. The tube is held against the rollers 148 and 150 by lower rollers 156 and 158 mounted respectively on trunnions 160 and 162 carried by the members 146. It will be clear from this disclosure that the tube is mounted so that it is capable of rotation while remaining exactly centered with respect to the chuck 72. As indicated in the drawings, the guide structure mounted on the base 128 carries the strip guide 38 which has its members 34 and 36 contacting with the strip as it forms the helical fin on the tube.

The second stage of the illustrative manufacture is carried out by an electric arc welding machine by which the fin is permanently secured to the tube by deposits of weld metal on each side of each fin convolution. In this step of manufacture, the fin is arc welded throughout its length to the tube by deposits of weld metal made at the line of juncture of the fin and the tube. Figs. 5, 6, 7, and 8 indicate the apparatus for carrying out this second stage of the manufacture.

Referring to Fig. 5 of the drawings, the completely finned tube 168 is gripped at one end by a chuck or holder 170 which is preferably similar to the chuck 72 already described. This holder is mounted on the transmission 172 driven by a motor 174. The motor and transmission are shown mounted upon a carriage platform 176 which is guided and supported by flanged rollers 178 and 180. These rollers run along a machine bed 182 formed with bevelled marginal portions 184 against which guide rollers 186 bear. These rollers 186 in cooperation with the rollers 178 and 180 hold the carriage against any transverse or lateral movement relative to the machine bed.

Mounted near one end of the machine bed are tube positioning members herein shown as rotatable disks 200 and 202. The disks 200 are disposed with their axes in alignment on one side of the tube axis and the disks 202 are similarly disposed with their common axis on the other side of the tube axis so that the sets of disks constitute a structure in the nature of a cradle for centering and positioning the tubes accurately with respect to the center of the chuck 170. The degree of offset between corresponding positioning members 202 and 200 depends upon the pitch of the fin, the offset being such that the corresponding members contact with the same fin convolutions on opposite sides of the tube axis. The disks 200 and 202 not only position the tube so that it may be acted upon by the welding electrodes, but they also act to determine the pitch of the fin and to hold the fin in the desired pitch arrangement while it is welded. They may be called "pitch determinators". This arrangement of elements also results in the advancement of the tube through the machine as it is rotated by the chuck 170, such advancement occurring by reason of the contact of the fin with the positioning members 200 and 202.

Figure 7:
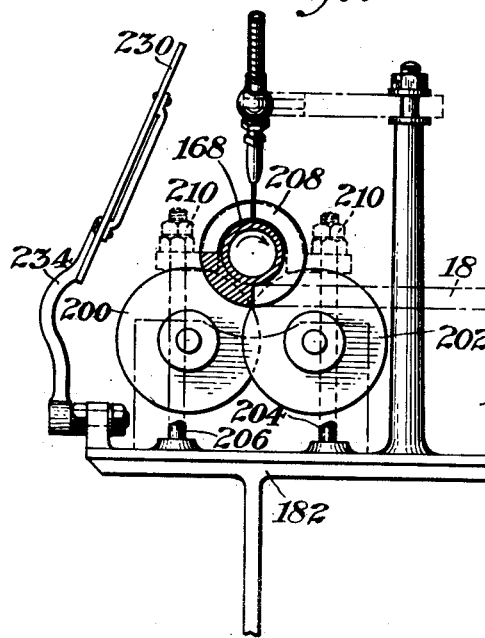
Fig. 7 is a view in the nature of an end elevation taken from the position indicated by the line 7—7 of Fig. 5 and showing the finned tube in section.
Figure 8:
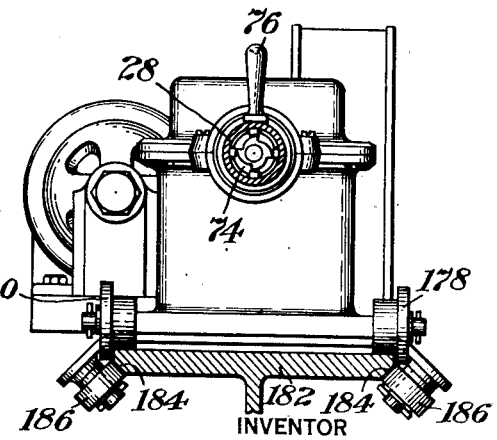
Fig. 8 is a vertical view taken on the line 8—8 of Fig. 5 and looking in the direction of the arrows.

Figs. 5, 6, and 7 illustrate means for preventing the tube from moving upwardly out of contact with the rotatable disks 200 and 202. This means comprises uprights 204 and 206 secured at their lower ends to the base 182. Fastened to the tops of these uprights is a U-shaped member 208 of such a curvature that it will closely overlap the tube 168 and extend between successive convolutions of the fin. Securing devices 210 hold the member 208 in operative position.

Fig. 5 of the drawings illustrates two spaced arc welding electrodes 212 and 214. These electrodes are mounted upon individually adjustable carriers 216 and 218 which are supported by the structural member 220. The ends of these electrodes nearest the tubes cause deposits of weld metal upon the remote sides of two successive fin parts. Excessive heating of the metal at a single fin part is thus avoided.

The electrodes are in the form of metallic wires which are fed from independently movable reels 222 and 224 by feeding mechanism engaging at 226 and 228.

Regardless of the cross-sectional shape of the bar or strip used to produce the fin in the procedure described in this application, there is differential stretching of different parts of the bar during the operation. That part of the bar which constitutes the outside or the outermost portion of the fin is always stretched to a greater extent than portions radially nearer to the center of the final product. Such devices as those indicated in Figs. 9, 10, and 11 of the drawings not only promote such differential stretching, but they operate upon the fin strip to change its contour. If the fin strip is of rectangular cross-section it will be tapered in the final product, but it is conceivable that fin strips may be used which will not have a tapered cross-section in the final product.

It is within the scope of the invention that the helix may be formed separately from the particular structure which ultimately forms the core of the final product. In such a case, the pre-formed helix may be removed after it is wound, and then placed around the final core. It may even be tack-welded to that core. The invention, of course includes the steps which result in the positioning of a helical fin around the core in such a way that it will be fixed thereto without subsequent welding.

Fig. 7 indicates an operator's shield 230 having an opening in which a transparent pane is located. This shield is carried by an upright 234 secured to the base 182 as indicated.

After the above described steps are completed the fins are cut so that they form separate radial segments presenting radial slots 236 (Fig. 6) between them.

While this invention has been described with reference to the particular disclosure in the accompanying drawings, it is to be understood that it is not limited thereto, but is of a scope commensurate with the scope of the sub-joined claims.

What is claimed is:

1. The manufacture of helically finned heat exchangers comprising securing one end of a long strip of metal to a plain metal tube, turning the tube to place the strip under tension and to stretch it, simultaneously heating the strip, causing the tube to move lengthwise as it is rotated so as to cause the strip to form a helical fin on the tube, subsequently simultaneously welding a plurality of convolutions of the fin to the tube, and cutting radial slots in the fins.

2. In apparatus of the class described, a plurality of spaced disks, means for mounting the disks so that they are freely rotatable while fixed against movement longitudinally of their axes, a second set of spaced and similarly mounted disks rotatable about a fixed axis parallel to the axis of the first set of disks, means for turning a fin tube resting upon said sets of disks with its fins interposed with relation to adjacent disks of the sets, arc welding electrodes mounted above said sets of disks and extending toward the juncture of the external sides of two adjacent fin convolutions and the tube so that the electrodes are always supported at a distance apart greater than the pitch of the fin as the tube is moved by reason of the contact of the helical fins with the disks, and means for automatically advancing the electrodes as their metal is deposited to weld the fins to the tubes.

3. The method of welding a helical fin to an enclosed tube comprising, affixing the tube within the fin with temporary security, rotating the tube with its fins engaging rotatable supports fixed relative to movement lengthwise of the tube and thus advancing the tube past a plurality of metallic arc welding electrodes which simultaneously deposit weld metal on the remote sides of the adjacent fin convolutions.

4. The manufacture of a helically finned heat exchanger tube which comprises affixing the tube within a helix formed by the fin so that the tube may be advanced by devices acting on the fin, and rotating the tube with the fins engaging rotatable supports interposed relative to adjacent fins and fixed relative to movement lengthwise of the tube for advancing the tube past a plurality of metallic arc welding electrodes, and simultaneously depositing weld metal on the remote sides of two adjacent fin convolutions.

5. The manufacture of a helically finned heat exchanger tube which comprises temporarily affixing the tube to the fin so that it is enclosed within the fin helix, advancing the tube by rotating it while the fin is in engagement with rotatable supports fixed against substantial movement in one direction longitudinally of the tube, and simultaneously depositing weld metal on the remote sides of two adjacent fin convolutions to provide two continuous deposits of weld metal joining the fin to the tube.

6. An electric arc welding machine comprising, in combination, a machine bed having parallel rails running lengthwise thereof, a carriage portably mounted on the bed so as to be freely movable along the rails, a support fixed at one end of the bed, a rotatable chuck mounted in the carriage for gripping the tube with its axis parallel to the rails, freely rotatable disks on the support arranged with their axes on opposite sides of the tube axis so that the disks cradle the tube to center it, and a plurality of metallic arc welding electrodes contacting with the tube at spaced positions above the disks, the disks on opposite sides of the tube axis being offset longitudinally of the tube so as to contact with helical fins on the tube to cause its advancement as the chuck turns the tube.

7. The manufacture of helically finned tubes comprising securing one end of a long strip of metal to a plain metal tube, turning the tube to place the strip under tension and to stretch it, simultaneously heating the strip, causing the tube to move lengthwise as it is rotated so as to cause the strip to form a tapered helical fin on the tube, subsequently welding the fin to the tube by simultaneous welding operations taking place at positions spaced from each other a distance greater than the maximum thickness of the fin.

8. The method of welding a helical fin to an enclosed tube comprising affixing the tube within the fin with temporary security, rotating the tube with its fins engaging rotatable supports fixed against substantial movement lengthwise of the tube and thus advancing the tube past a plurality of metallic arc welding electrodes which simultaneously deposit weld metal at positions so spaced along the fin that the welding produced by one electrode is not affected by that produced by an adjacent electrode.

9. The manufacture of a helically finned tube which comprises affixing a helical fin to a tube, and rotating the tube with the fin engaging a support interposed relative to adjacent fin convolutions and fixed against substantial movement lengthwise of the tube for advancing the tube past a plurality of metallic arc welding electrodes, and simultaneously depositing weld metal along the line of contact of the fin and the tube at positions on opposite sides of the fin and spaced a distance greater than the pitch of the fin.

10. The manufacture of a helically finned tube which comprises temporarily affixing the fin to the tube so that the tube is enclosed within the fin helix, advancing the tube by rotating it while the fin is in engagement with a fixed support, and simultaneously depositing weld metal on the opposite sides of the fin at substantially spaced positions to provide two continuous deposits of weld metal joining the fin to the tube.

11. The manufacture of a finned tube which comprises forming the fin on the tube so that the tube is enclosed within the fin helix, advancing the tube by rotating it while the fin is in engagement with a support fixed against substantial movement longitudinally of the tube, and simultaneously depositing weld metal at spaced positions on the opposite sides of the fin to provide two continuous deposits of weld metal joining the fin to the tube, the positions of simultaneous weld metal depositing being spaced from each other a distance greater than the pitch of the fin.

12. In the manufacture of helically finned tubes, forming a metal bar into a helical fin which encloses the tube, spacing adjacent convolutions of the fin so that the fin has the desired pitch, and welding said fin convolutions to the tube while they are held in the desired pitch relationship.

13. In apparatus for manufacturing helically finned tubes, means for rotating a tube with a helical fin secured thereon, means for depositing weld metal to secure the fin to the tube, and spaced pitch determinators engaging opposite sides of a fin convolution to hold said convolution in the desired pitch relationship to an adjacent convolution while the welding is taking place.

14. In the manufacture of helically finned tubes, forming a metal bar into a helical fin which encloses the tube, spot welding the fin to the tube at one position, spacing adjacent convolutions of the fin so that the fin has the desired pitch, and welding said fin convolutions to the tube while they are held in the desired pitch relationship.

15. In apparatus for manufacturing helically finned tubes, means for rotating a tube together with a helical fin secured thereon, means for depositing a line of weld metal to secure the fin to the tube, and rotatable spaced pitch determinators engaging opposite sides of a fin convolution and holding said convolution in the desired pitch relationship to an adjacent convolution while the welding is taking place.

16. In apparatus for manufacturing helically finned tubes, means for supporting a tube for rotation about a fixed axis, means for rotating the tube, means for causing the tube to be advanced longitudinally as it is rotated, pressure means tending to cause substantial retardation of the progress of a metal bar as it is stretched by the rotation of the tube to form a helical fin upon the tube, means to heat the bar prior to its engagement with the pressure means, said pressure means acting without causing material deformation of the bar, and fusion welding means developing independent arcs cooperating with the advancing tube to weld the fin to the tube.

17. In apparatus for manufacturing helically finned tubes, means for rotating a tube having a helical fin secured thereon, means for depositing a line of weld metal to secure the fin to the tube, rotatable disks constituting spaced pitch determinators engaging opposite sides of a fin convolution to hold said convolution in the desired pitch relationship to an adjacent convolution while the welding is taking place, and means acting to prevent the tube from so moving as to take the fin out of contact with said disks.

JAMES E. TRAINER.